(12) United States Patent
Shikanai (10) Patent No.: US 12,281,908 B2
(45) Date of Patent: Apr. 22, 2025

(54) INFORMATION PROCESSING APPARATUS, INFORMATION PROCESSING METHOD, AND STORAGE MEDIUM

(71) Applicant: TOYOTA JIDOSHA KABUSHIKI KAISHA, Toyota (JP)

(72) Inventor: Koji Shikanai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 17/827,292

(22) Filed: May 27, 2022

(65) Prior Publication Data
US 2022/0412756 A1 Dec. 29, 2022

(30) Foreign Application Priority Data

Jun. 25, 2021 (JP) .................................. 2021-105986
Feb. 24, 2022 (JP) .................................. 2022-027320

(51) Int. Cl.
*G01C 21/34* (2006.01)
*B60W 40/06* (2012.01)

(52) U.S. Cl.
CPC ......... *G01C 21/3461* (2013.01); *B60W 40/06* (2013.01); *B60W 2520/105* (2013.01); *B60W 2520/125* (2013.01); *B60W 2520/14* (2013.01); *B60W 2520/28* (2013.01)

(58) Field of Classification Search
CPC .......... B60W 40/06; B60W 2520/105; B60W 2520/125; B60W 2520/14; B60W 2520/28; B60W 2556/50; B60W 2556/40; B60W 2756/10; G01C 21/3461; G06N 3/0442;
(Continued)

(56) References Cited

U.S. PATENT DOCUMENTS

| | | | |
|---|---|---|---|
| 2010/0100360 A1* | 4/2010 | Deng | B60T 8/172 703/2 |
| 2014/0222321 A1* | 8/2014 | Petty | G08G 1/012 701/533 |
| 2017/0193338 A1* | 7/2017 | Huberman | G06V 10/82 |

(Continued)

FOREIGN PATENT DOCUMENTS

| | | | | |
|---|---|---|---|---|
| EP | 3882880 A1 * | 9/2021 | | B60W 40/06 |
| JP | H08-201235 A | 8/1996 | | |

(Continued)

OTHER PUBLICATIONS

WO 2013151104 translation (Year: 2013).*

*Primary Examiner* — Kyle T Johnson
(74) *Attorney, Agent, or Firm* — Oliff PLC (57) ABSTRACT

An information processing apparatus acquires vehicle state information for each of a plurality of vehicles. The information processing apparatus estimates road surface state information of a road surface on which each of the vehicles has traveled, based on the acquired vehicle state information for each of the vehicles. The information processing apparatus estimates the road surface state information by inputting the acquired vehicle state information to a trained model that outputs the road surface state information in a case where the vehicle state information is input and that has been trained in advance based on training data in which the vehicle state information and the road surface state information are associated with each other.

4 Claims, 7 Drawing Sheets

(58) Field of Classification Search
CPC ...... G06N 3/09; G08G 1/0112; G08G 1/0145; G08G 1/096811; G08G 1/096844
See application file for complete search history.

(56) References Cited

U.S. PATENT DOCUMENTS

| | | | |
|---|---|---|---|
| 2019/0329786 A1* | 10/2019 | Kimura | B60W 40/072 |
| 2019/0376811 A1* | 12/2019 | Roy Chowdhury | G01C 21/3694 |
| 2020/0180590 A1* | 6/2020 | Jung | B60T 8/1755 |
| 2020/0377096 A1* | 12/2020 | Park | B60W 10/06 |
| 2021/0046937 A1* | 2/2021 | Hattori | G08G 1/0112 |
| 2021/0064891 A1* | 3/2021 | Kimura | G06F 3/14 |
| 2021/0229670 A1* | 7/2021 | Singh | B60T 8/1725 |
| 2021/0278209 A1* | 9/2021 | Wessels | G01B 21/30 |
| 2021/0396530 A1* | 12/2021 | Blanc-Paques | G08G 5/0034 |
| 2022/0063630 A1* | 3/2022 | Park | B60W 10/06 |
| 2022/0348045 A1* | 11/2022 | Sallusti | G06F 17/142 |
| 2022/0412756 A1* | 12/2022 | Shikanai | G08G 1/0112 |

FOREIGN PATENT DOCUMENTS

| | | | | |
|---|---|---|---|---|
| JP | 2015-028456 | A | 2/2015 | |
| JP | 6795064 | B1 | 12/2020 | |
| JP | 2021-002161 | A | 1/2021 | |
| JP | 2021-033130 | A | 3/2021 | |
| WO | WO-2013151104 | A1 * | 10/2013 | ............... B60K 6/48 |
| WO | WO-2019228848 | A1 * | 12/2019 | ........... G06N 3/0445 |

\* cited by examiner

| VEHICLE ID | TIME INFORMATION | POSITIONAL INFORMATION | WHEEL SPEED INFORMATION | FRONT-REAR VEHICLE BODY ACCELERATION INFORMATION | RIGHT-LEFT VEHICLE BODY ACCELERATION INFORMATION | YAW RATE INFORMATION |
|---|---|---|---|---|---|---|
| | | | {— SENSOR INFORMATION —} | | | |
| | | {———————————— TRAVEL INFORMATION ————————————} | | | | |
| 00001 | t1 | AAA | BBB | CCC | DDD | EEE |
| ⋮ | ⋮ | ⋮ | ⋮ | ⋮ | ⋮ | ⋮ |
| ⋮ | ⋮ | ⋮ | ⋮ | ⋮ | ⋮ | ⋮ |

| DATA ID | TRAINING TIME INFORMATION | TRAINING DIFFERENTIAL VALUE INFORMATION OF WHEEL SPEED | TRAINING FRONT-REAR VEHICLE BODY ACCELERATION INFORMATION | TRAINING RIGHT-LEFT VEHICLE BODY ACCELERATION INFORMATION | TRAINING YAW RATE INFORMATION | TRAINING IRI |
|---|---|---|---|---|---|---|
| 00001 | ⋮ | ⋮ | ⋮ | ⋮ | ⋮ | ⋮ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |

INFORMATION PROCESSING APPARATUS, INFORMATION PROCESSING METHOD, AND STORAGE MEDIUM

CROSS-REFERENCE TO RELATED APPLICATION

This application claims priority to Japanese Patent Application No. 2021-105986 filed on Jun. 25, 2021 and Japanese Patent Application No. 2022-027320 filed on Feb. 24, 2022, each incorporated herein by reference in its entirety.

BACKGROUND

1. Technical Field

The present disclosure relates to an information processing apparatus, an information processing method, and a storage medium.

2. Description of Related Art

In the related art, in a road surface diagnosis method using a vehicle response, a road surface evaluation device that eliminates the dependence on a sensor installation location is known (see, for example, Japanese Unexamined Patent Application Publication No. 2015-028456 (JP 2015-028456 A)). The road surface evaluation device disclosed in JP 2015-028456 A records a pitching angular velocity of a vehicle acquired by an angular velocity sensor in synchronization with GPS information acquired by a GPS. Moreover, the road surface evaluation device estimates an acceleration response of a quarter car that is a reference virtual vehicle from an angular velocity response of a measurement vehicle by using a transfer function from the acquired pitching angular velocity of the vehicle. Moreover, the road surface evaluation device estimates an international roughness index (IRI) from the estimated acceleration response of the quarter car by using a correlation function. Note that the technology disclosed in JP 2015-028456 A proposes an IRI estimation method using a smartphone (for example, paragraph "0051"), in which the smartphone is fixed to a front center portion of the vehicle (for example, paragraph "0054"), and various values are measured by using the smartphone.

In addition, there is known a technology of enabling a user to more easily design a maintenance plan in accordance with a type of an abnormality of a road (see, for example, Japanese Unexamined Patent Application Publication No. 2021-033130 (JP 2021-033130 A)). A display processing apparatus disclosed in JP 2021-033130 A detects a first abnormal section that is a road section having a road state of a first abnormality and a second abnormal section that is a road section having a road state of a second abnormality different from the first abnormality based on vehicle information from a plurality of vehicles. Moreover, the display processing apparatus provides state information to the first abnormal section, in the road of a display map, in a first display mode and provides the state information to the second abnormal section in a second display mode different from the first display mode to display the first abnormal section and the second abnormal section on a display device.

SUMMARY

The technology disclosed in JP 2015-028456 A cannot acquire road surface state information (for example, road surface roughness information indicating roughness of a road surface) indicating a state of the road surface of a road on which the vehicle that is not equipped with the smartphone has traveled. Therefore, the technology disclosed in JP 2015-028456 A has a problem that more road surface state information cannot be obtained.

In addition, the display processing apparatus disclosed in the JP 2021-033130 A estimates the road state based on the vehicle information from the vehicles and displays the road state. However, in the display processing apparatus disclosed in JP 2021-033130 A, complex processing, such as determining that the road state of a target section is abnormal in a case where a maximum wheel speed change rate of the target section of all target vehicles is equal to or higher than a threshold value or in a case where an avoidance behavior ratio is equal to or higher than a threshold value, is needed (for example, paragraph "0093" of JP 2021-033130 A). Therefore, the technology disclosed in JP 2021-033130 A has a problem that the road surface state information cannot be easily estimated.

Therefore, the related art has a problem that the road surface state cannot be easily estimated from vehicle state information of the vehicles.

The present disclosure is to easily estimate a road surface state from vehicle state information of a plurality of vehicles by using a trained model generated in advance by machine learning in consideration of the above circumstance.

A first aspect of the present disclosure relates to an information processing apparatus including an acquisition unit and an estimation unit. The acquisition unit is configured to acquire vehicle state information for each of a plurality of vehicles. The estimation unit is configured to estimate road surface state information of a road surface on which each of the vehicles has traveled, based on the vehicle state information for each of the vehicles acquired by the acquisition unit. The estimation unit is configured to estimate the road surface state information by inputting the vehicle state information acquired by the acquisition unit to a trained model that outputs the road surface state information in a case where the vehicle state information is input and that has been trained in advance based on training data in which the vehicle state information and the road surface state information are associated with each other.

The information processing apparatus according to the first aspect of the present disclosure acquires the vehicle state information for each of the vehicles. The information processing apparatus estimates the road surface state information of the road surface on which each of the vehicles has traveled, based on the acquired vehicle state information for each of the vehicles. The information processing apparatus estimates the road surface state information by inputting the vehicle state information to the trained model that outputs the road surface state information in a case where the vehicle state information is input and that has been trained in advance based on the training data in which the vehicle state information and the road surface state information are associated with each other. With the information processing apparatus according to the first aspect of the present disclosure, it is possible to easily estimate the road surface state from the vehicle state information of the vehicles by using the trained model generated in advance by machine learning.

The information processing apparatus according to a second aspect of the present disclosure may further include a travel route generation unit configured to, in a case where the road surface state information of the road surface indicates an abnormal state, generate a travel route of the vehicle without including a road corresponding to the road surface in the travel route of the vehicle. As a result, it is possible to present the travel route that avoids the road of which the road surface is in an abnormal state.

In the information processing apparatus according a third aspect of the present disclosure, the vehicle state information may include at least one of information indicating front-rear vehicle body acceleration of the vehicle, information indicating right-left vehicle body acceleration of the vehicle, and information indicating a yaw rate of the vehicle. As a result, it is possible to accurately estimate the road surface state information by using at least one of the information indicating the front-rear vehicle body acceleration of the vehicle that is considered to be affected by the road surface state, the information indicating the right-left vehicle body acceleration of the vehicle, and the information indicating the yaw rate of the vehicle.

In the information processing apparatus according a fourth aspect of the present disclosure, the vehicle state information may include wheel speed information indicating a wheel speed of the vehicle. As a result, it is possible to accurately estimate the road surface state information by using the wheel speed that is considered to be affected by the road surface state.

In the information processing apparatus according a fifth aspect of the present disclosure, the estimation unit may be configured to estimate the road surface state information of the road surface on which the vehicle has traveled by differentiating the wheel speed information indicating the wheel speed of the vehicle included in the vehicle state information of the vehicle to calculate a differential value of the wheel speed of the vehicle and inputting the differential value of the wheel speed of the vehicle to the trained model. As a result, it is possible to accurately estimate the road surface state information by using the differential value of the wheel speed that is considered to be affected by the road surface state.

In the information processing apparatus according to a sixth aspect of the present disclosure, the acquisition unit may be configured to acquire travel information indicating a combination of the vehicle state information for each of the vehicles and positional information when the vehicle state information is acquired, from a storage unit configured to store the travel information, the estimation unit may be configured to estimate the road surface state information of the road surface on which the vehicle has traveled, based on the vehicle state information in the travel information of the vehicle acquired by the acquisition unit for each of the vehicles, and the information processing apparatus may further include a generation unit configured to add the road surface state information to a position corresponding to the positional information in map data to generate the map data to which the road surface state information is added, based on the positional information in the travel information of the vehicle acquired by the acquisition unit for each of the vehicles, and the estimated road surface state information. As a result, it is possible to visualize the information on the road surface state of a plurality of roads.

A seventh aspect of the present disclosure relates to an information processing method executed by a computer. The method includes acquiring vehicle state information for each of a plurality of vehicles. The method includes estimating road surface state information of a road surface on which each of the vehicles has traveled, based on the acquired vehicle state information for each of the vehicles. In a case where the road surface state information is estimated, the road surface state information is estimated by inputting the acquired vehicle state information to a trained model that outputs the road surface state information in a case where the vehicle state information is input and that has been trained in advance based on training data in which the vehicle state information and the road surface state information are associated with each other. With the seventh aspect of the present disclosure, similar to the first aspect, it is possible to easily estimate the road surface state from the vehicle state information of the vehicles by using the trained model generated in advance by machine learning.

An eighth aspect of the present disclosure relates to a non-transitory storage medium storing an information processing program causing a computer to execute a process. The process includes acquiring vehicle state information for each of a plurality of vehicles. The process includes estimating road surface state information of a road surface on which each of the vehicles has traveled, based on the acquired vehicle state information for each of the vehicles. In a case where the road surface state information is estimated, the road surface state information is estimated by inputting the acquired vehicle state information to a trained model that outputs the road surface state information in a case where the vehicle state information is input and that has been trained in advance based on training data in which the vehicle state information and the road surface state information are associated with each other. With the eighth aspect of the present disclosure, similar to the first aspect, it is possible to easily estimate the road surface state from the vehicle state information of the vehicles by using the trained model generated in advance by machine learning.

A ninth aspect of the present disclosure relates to an information processing apparatus including an acquisition unit, an estimation unit, and a generation unit. The acquisition unit is configured to acquire travel information indicating a combination of vehicle state information for each of a plurality of vehicles indicating a travel state of the vehicle obtained in a case where the vehicle has traveled and positional information of the vehicle that has traveled, from a storage unit configured to store the travel information. The estimation unit is configured to estimate road surface roughness information of a road surface on which the vehicle has traveled, based on the vehicle state information in the travel information of the vehicle acquired by the acquisition unit for each of the vehicles. The generation unit is configured to add the road surface roughness information to a position corresponding to the positional information in map data to generate the map data to which the road surface roughness information is added, based on the positional information in the travel information of the vehicle acquired by the acquisition unit for each of the vehicles, and the road surface roughness information estimated by the estimation unit.

The information processing apparatus according to the ninth aspect of the present disclosure acquires the travel information indicating the combination of the vehicle state information for each of the vehicles indicating the travel state of the vehicle obtained in a case where the vehicle has traveled and the positional information of the vehicle that has traveled, from the storage unit that stores the travel information. Moreover, the information processing apparatus estimates the road surface roughness information of the road surface on which the vehicle has traveled, based on the vehicle state information in the acquired travel information of the vehicle for each of the vehicles. The information processing apparatus adds the road surface roughness information to the position corresponding to the positional information in the map data to generate the map data to which the road surface roughness information is added, based on the positional information in the acquired travel information of the vehicle for each of the vehicles, and the estimated road surface roughness information. As a result, it is possible to visualize the information on the road surface roughness of the roads.

In the information processing apparatus according a tenth aspect of the present disclosure, the vehicle state information may include wheel speed information indicating a wheel speed of the vehicle. As a result, it is possible to accurately estimate the road surface roughness information by using the wheel speed that is considered to be affected by the road surface roughness.

In the information processing apparatus according to an eleventh aspect of the present disclosure, the estimation unit may be configured to estimate the road surface roughness information of the road surface on which the vehicle has traveled by inputting the vehicle state information acquired by the acquisition unit to a trained model that outputs the road surface roughness information of the road surface on which the vehicle has traveled in a case where the vehicle state information of the vehicle is input and that has been trained in advance based on training data in which training vehicle state information and training road surface roughness information are associated with each other. As a result, it is possible to accurately estimate the road surface roughness information by using the trained model generated based on the training data in which the training vehicle state information and the training road surface roughness information are associated with each other.

In the information processing apparatus according a twelfth aspect of the present disclosure, the estimation unit may be configured to estimate the road surface roughness information of the road surface on which the vehicle has traveled by differentiating the wheel speed information indicating the wheel speed of the vehicle included in the vehicle state information of the vehicle to calculate a differential value of the wheel speed of the vehicle and inputting the vehicle state information including the differential value of the wheel speed of the vehicle to the trained model. As a result, it is possible to accurately estimate the road surface roughness information by using the differential value of the wheel speed that is considered to be affected by the road surface roughness.

In the information processing apparatus according a thirteenth aspect of the present disclosure, the vehicle state information may include at least one of information indicating front-rear vehicle body acceleration of the vehicle, information indicating right-left vehicle body acceleration of the vehicle, and information indicating a yaw rate of the vehicle. As a result, it is possible to accurately estimate the road surface roughness information by using at least one of the information indicating the front-rear vehicle body acceleration of the vehicle that is considered to be affected by the road surface roughness, the information indicating the right-left vehicle body acceleration of the vehicle, and the information indicating the yaw rate of the vehicle.

A fourteenth aspect of the present disclosure relates to an information processing method executed by a computer. The method includes acquiring travel information indicating a combination of vehicle state information for each of a plurality of vehicles indicating a travel state of the vehicle obtained in a case where the vehicle has traveled and positional information of the vehicle that has traveled, from a storage unit configured to store the travel information. The method includes estimating road surface roughness information of a road surface on which the vehicle has traveled, based on the vehicle state information in the acquired travel information of the vehicle for each of the vehicles. The method includes adding the road surface roughness information to a position corresponding to the positional information in map data to generate the map data to which the road surface roughness information is added, based on the positional information in the acquired travel information of the vehicle for each of the vehicles, and the estimated road surface roughness information. With the fourteenth aspect of the present disclosure, similar to the ninth aspect, it is possible to visualize the information on the road surface roughness of the roads.

A fifteenth aspect of the present disclosure relates to a non-transitory storage medium storing an information processing program causing a computer to execute a process. The process includes acquiring travel information indicating a combination of vehicle state information for each of a plurality of vehicles indicating a travel state of the vehicle obtained in a case where the vehicle has traveled and positional information of the vehicle that has traveled, from a storage unit configured to store the travel information. The process includes estimating road surface roughness information of a road surface on which the vehicle has traveled, based on the vehicle state information in the acquired travel information of the vehicle for each of the vehicles. The process includes adding the road surface roughness information to a position corresponding to the positional information in map data to generate the map data to which the road surface roughness information is added, based on the positional information in the acquired travel information of the vehicle for each of the vehicles, and the estimated road surface roughness information. With the fifteenth aspect of the present disclosure, similar to the ninth aspect, it is possible to visualize the information on the road surface roughness of the roads.

With the present disclosure as described above, there is an effect that the road surface state can be easily estimated from the vehicle state information of the vehicles by using the trained model generated in advance by machine learning.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

In the following, an information processing system according to the present embodiment will be described with reference to the drawings.

Figure 1:
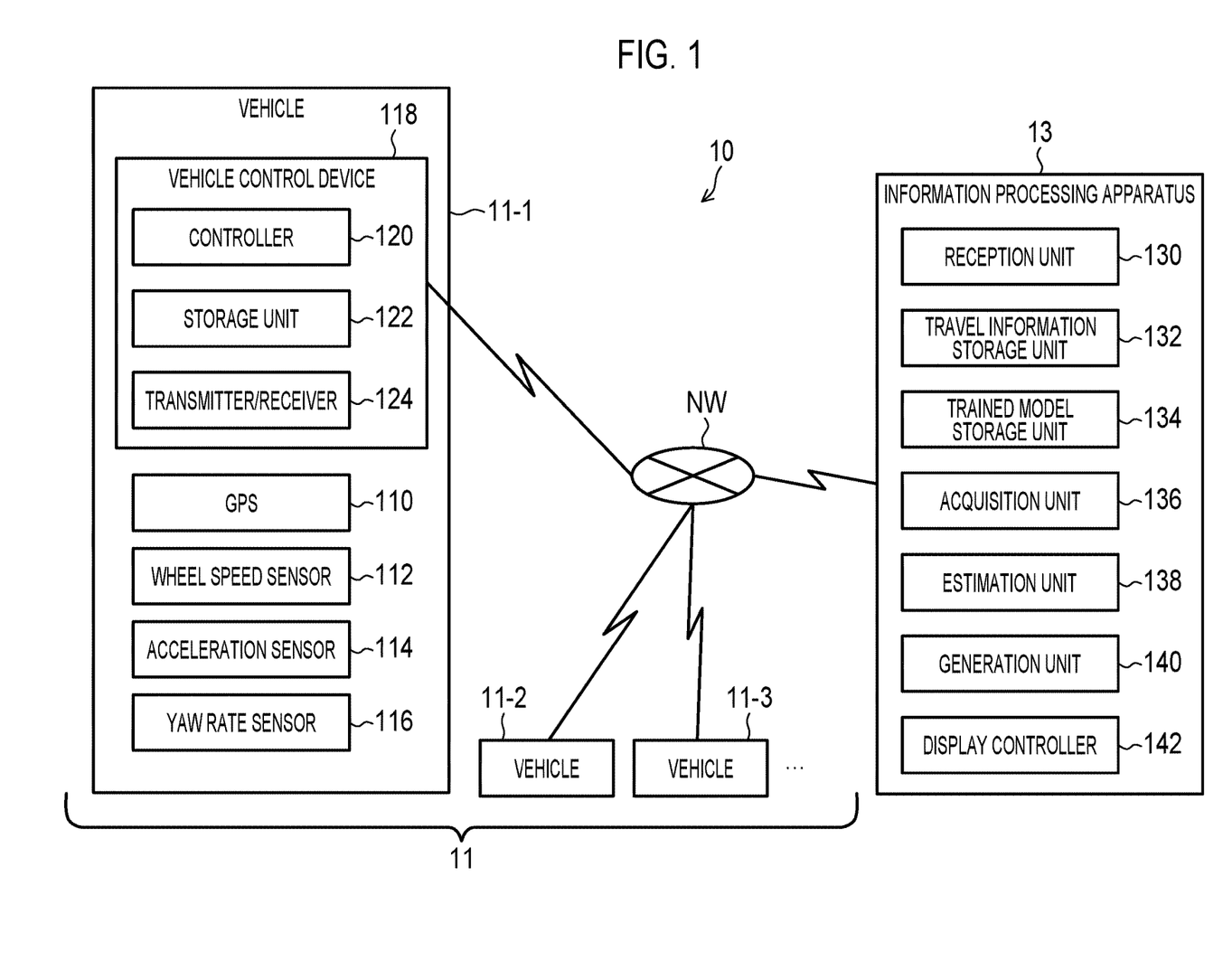
FIG. 1 is a schematic block diagram of an information processing system according to an embodiment.

FIG. 1 is a block diagram showing an example of a configuration of an information processing system 10 according to the present embodiment. As shown in FIG. 1, the information processing system 10 includes a plurality of vehicles 11-1, 11-2, 11-3, and an information processing apparatus 13. The vehicles 11-1, 11-2, 11-3 and the information processing apparatus 13 are communicably connected by a predetermined communication unit NW. Note that, in the following, any one of the vehicles 11-1, 11-2, 11-3 will be simply referred to as "vehicle 11". In the example of FIG. 1, three vehicles 11-1, 11-2, 11-3 are shown, but more vehicles may be present.

Vehicle 11

The vehicle 11 is equipped with a global positioning system (GPS) 110, a wheel speed sensor 112, an acceleration sensor 114, a yaw rate sensor 116, and a vehicle control device 118. The vehicle control device 118 is, for example, an electronic control unit (ECU).

The GPS 110 sequentially acquires positional information of the vehicle

The wheel speed sensor 112 sequentially acquires wheel speed information indicating a wheel speed of the vehicle 11.

The acceleration sensor 114 sequentially acquires front-rear vehicle body acceleration information indicating front-rear vehicle body acceleration of the vehicle 11 and right-left vehicle body acceleration information indicating right-left vehicle body acceleration of the vehicle 11.

The yaw rate sensor 116 sequentially acquires yaw rate information indicating a yaw rate of the vehicle 11.

Vehicle Control Device 118

As shown in FIG. 1, the vehicle control device 118 functionally includes a controller 120, an information storage unit 122, and a transmitter/receiver 124.

The controller 120 sequentially acquires the positional information acquired by the GPS 110, the wheel speed information acquired by the wheel speed sensor 112, the front-rear vehicle body acceleration information and the right-left vehicle body acceleration information acquired by the acceleration sensor 114, and the yaw rate information acquired by the yaw rate sensor 116, and stores the pieces of information in the information storage unit 122 in association with time information. Note that the time information is information indicating a time when each information is acquired by each sensor.

The information storage unit 122 stores the positional information, the wheel speed information, the front-rear vehicle body acceleration information, the right-left vehicle body acceleration information, and the yaw rate information of the vehicle 11 at each time.

The transmitter/receiver 124 transmits the positional information, the wheel speed information, the front-rear vehicle body acceleration information, the right-left vehicle body acceleration information, and the yaw rate information of the vehicle 11 stored in the information storage unit 122 and the time information when the pieces of information are acquired, to the information processing apparatus 13 each time a predetermined time elapses. Note that, in the following, the wheel speed information, the front-rear vehicle body acceleration information, the right-left vehicle body acceleration information, and the yaw rate information are also simply referred to as "sensor information".

Information Processing Apparatus 13

As shown in FIG. 1, the information processing apparatus 13 functionally includes a reception unit 130, a travel information storage unit 132, a trained model storage unit 134, an acquisition unit 136, an estimation unit 138, a generation unit 140, and a display controller 142.

The reception unit 130 receives various pieces of information transmitted from the vehicle control device 118 of each of the vehicles 11-1, 11-2, 11-3. Specifically, the reception unit 130 receives a combination of the positional information, the sensor information, and the time information transmitted from the vehicle control device 118 of each of the vehicles 11-1, 11-2, 11-3, and stores the pieces of information in the travel information storage unit 132 as the travel information.

The travel information storage unit 132 stores the travel information that is the combination of the positional information and the sensor information transmitted from the vehicle control device 118 of each of the vehicles 11-1, 11-2, 11-3.

Figure 2:
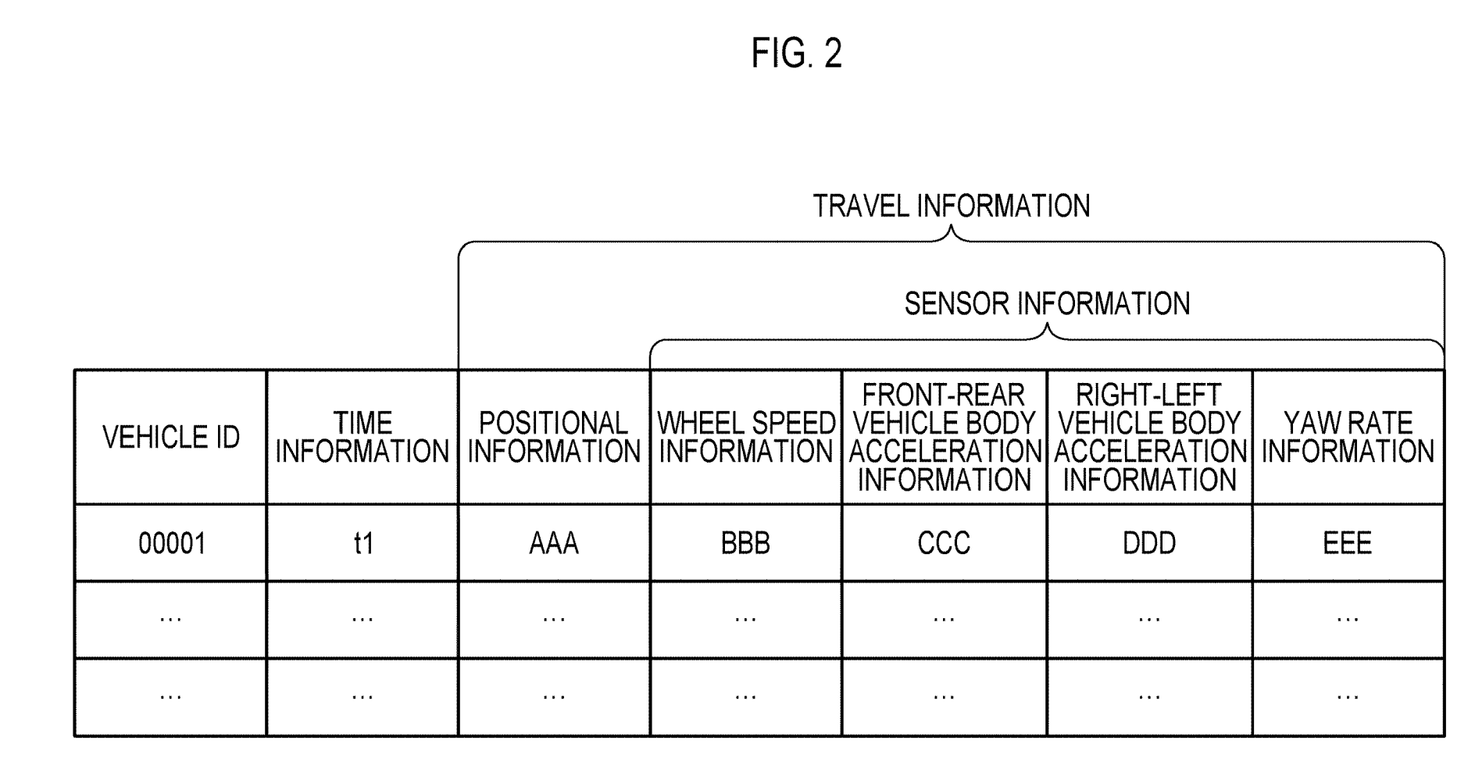
FIG. 2 is a diagram for describing an example of travel information and sensor information according to the embodiment.

FIG. 2 shows an example of the travel information stored in the travel information storage unit 132. In the example shown in FIG. 2, a vehicle ID that is identification information of the vehicle 11, the time information, the positional information, and the sensor information are stored in association with each other. The combination of the positional information and the sensor information at each time transmitted from the vehicle control device 118 is the travel information.

The trained model storage unit 134 stores a trained model that outputs road surface state information of a road surface on which the vehicle 11 has traveled, in a case where differential value information of the wheel speed, the front-rear vehicle body acceleration information, the right-left vehicle body acceleration information, and the yaw rate information of the vehicle 11, and the time information are input. Note that, in the following, the differential value information of the wheel speed, the front-rear vehicle body acceleration information, the right-left vehicle body acceleration information, and the yaw rate information are also simply referred to as "vehicle state information". Note that the trained model according to the present embodiment outputs road surface roughness information indicating the roughness of the road surface as an example of the road surface state information.

Figure 3:
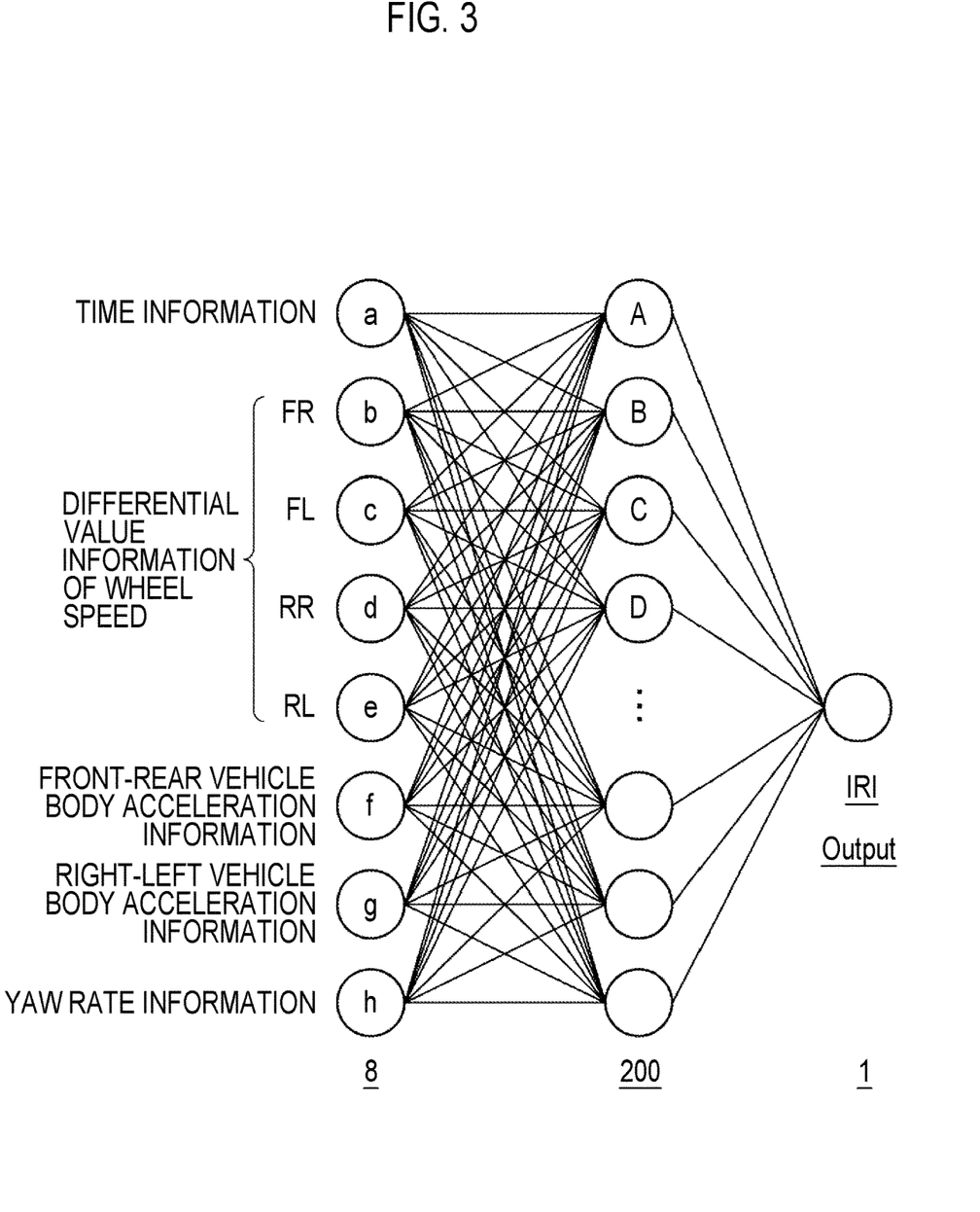
FIG. 3 is a diagram for describing a trained model according to the embodiment.

FIG. 3 shows an example of the trained model according to the present embodiment. As shown in FIG. 3, the trained model according to the present embodiment outputs the road surface roughness information of the road surface on which the vehicle 11 has traveled, in a case where the time information and the vehicle state information are input. Note that, in the differential value information of the wheel speed, "FR" indicates a differential value of a wheel speed of a right front wheel of the vehicle 11, "FL" indicates a differential value of a wheel speed of a left front wheel of the vehicle 11, "RR" indicates a differential value of a wheel speed of a right rear wheel of the vehicle 11, and "RL" indicates a differential value of a wheel speed of a left rear wheel of the vehicle 11. Since the trained model according to the present embodiment is a long short term memory (LSTM) network that is a type of a neural network model, the time information when vehicle state information is acquired is also input. Note that a, b, c, . . . , h of the trained model in FIG. 3 indicate nodes of an input layer, respectively, and A, B, C, D, . . . indicate nodes of an intermediate layer, respectively.

Note that, in the example of FIG. 3, it is shown that the number of nodes in the input layer is eight and the number of nodes in the intermediate layer is 200. A weight parameter is added to an edge connecting the nodes, and the weight parameter is adjusted in advance by machine learning.

As shown in FIG. 3, the trained model according to the present embodiment outputs an international roughness index (IRI) that is an example of the road surface roughness information. Using the trained model, the IRI of the road surface on which the vehicle 11 has traveled is estimated. In the present embodiment, the differential value of the wheel speed is adopted as a factor in a case of estimating the IRI of the road surface.

Here, a relationship between the IRI of the road surface and the differential value of the wheel speed will be described below.

Figure 4:
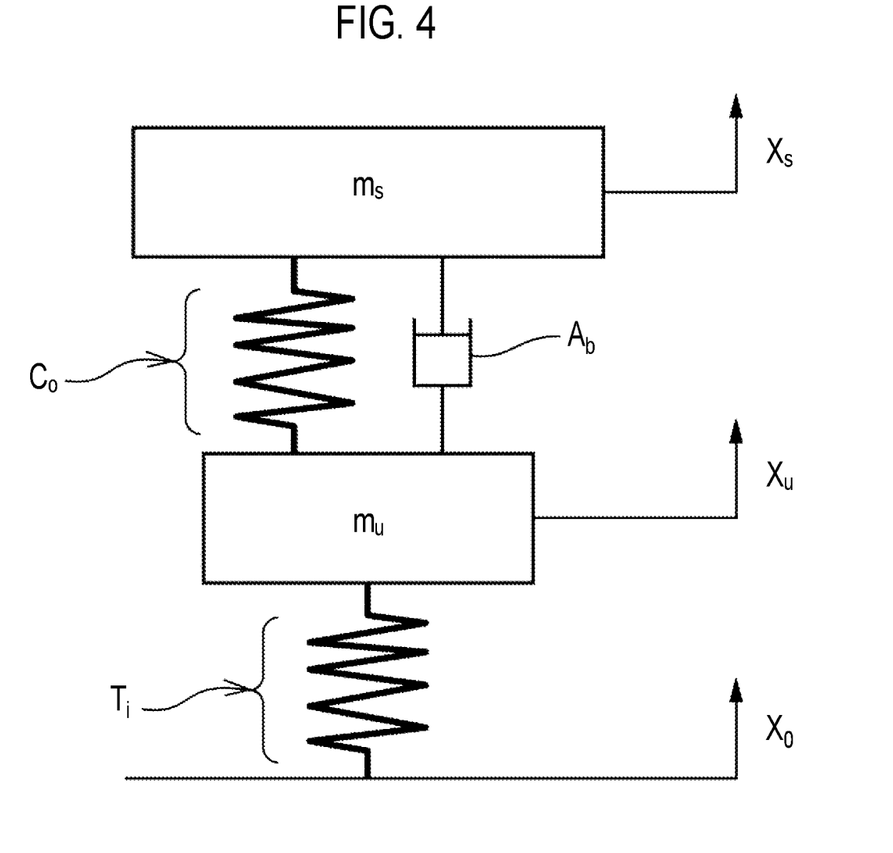
FIG. 4 is a diagram showing a single-ring spring math model.

FIG. 4 shows a diagram showing a known single-ring spring math model. As shown in FIG. 4, in the single-ring spring math model, sprung mass $m_s$, unsprung mass $m_u$, a coil Co, an absorber Ab, and a simulated tire Ti are modeled. Note that $X_S$ in FIG. 4 indicates sprung mass, and indicates a displacement of the sprung mass $m_s$. In addition, $X_U$ in FIG. 4 indicates unsprung mass, and indicates a displacement of the unsprung mass $m_u$. $X_O$ indicates the ground, and indicates a displacement of a ground plane.

As shown in the following expression, the IRI of the road surface is a ratio between a cumulative value of a vertical motion displacement received by the vehicle in a case where the vehicle travels at a certain vehicle speed and a travel distance L in the single-ring spring math model. Note that the dot "●" in the following expression indicates differentiation.

$$IRI = \left\{ \int_0^{\frac{L}{V}} |\dot{X}_s - \dot{X}_u| dt \right\}/L$$

In the present embodiment, the IRI of the road surface is estimated by the trained model without calculating the above expression.

Figure 5:
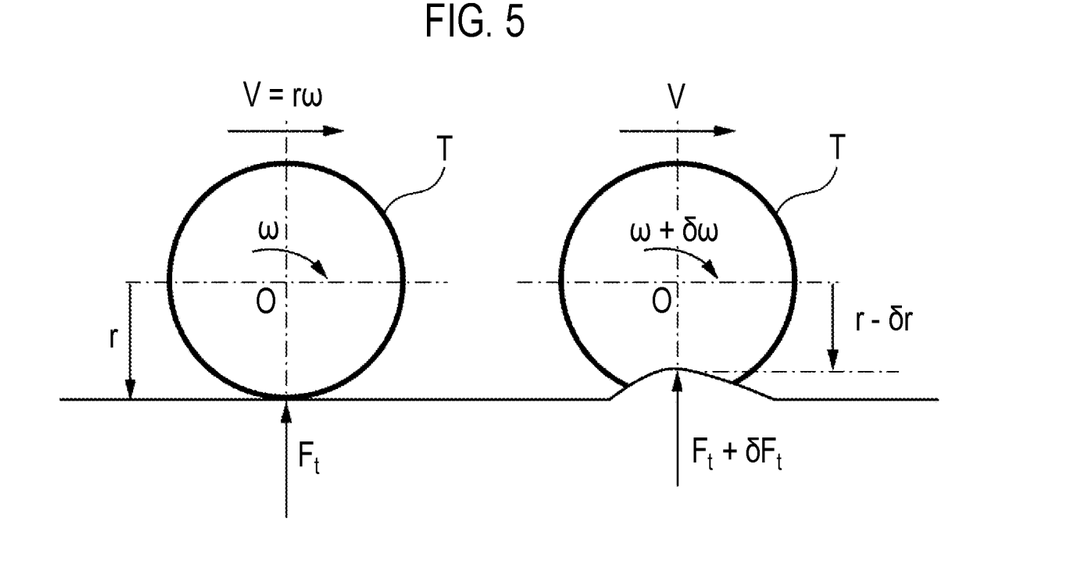
FIG. 5 is a diagram showing a relationship between a tire radius and a vertical load.

FIG. 5 shows a diagram showing a relationship between a tire radius and a vertical load. In FIG. 5, V indicates the vehicle speed, r indicates the tire radius, ω indicates the wheel speed, O indicates a center portion of a tire T, $F_t$ indicates the vertical load received by the tire T, and δ indicates a change amount.

Considering the single-ring spring math model shown in FIG. 4 and the relationship shown in FIG. 5, the following expression is derived. Note that $K_t$ indicates a spring constant of the tire.

$$\delta F_t = -K_t(X_0 - X_u) = -K_t \cdot \delta r$$

$$\delta V = \delta \omega \cdot r$$

$$= -\frac{V}{r}\delta r = \frac{V}{r} \cdot \frac{\delta F_t}{K_t}$$

$$\delta \omega = \frac{V}{r^2 \cdot K_t} \cdot \delta F_t$$

The above expression holds between a change amount δω of the wheel speed and a change amount $\delta F_t$ of the vertical load received by the tire. Therefore, it can be seen that the wheel speed ω is affected by the vertical load $F_t$ received by the tire. As shown in FIG. 5, the vertical load $F_t$ received by the tire T is a quantity related to the IRI that is the road surface roughness. Therefore, in a case where the wheel speed ω is used when estimating the IRI of the road surface, it is considered that the IRI of the road surface can be estimated accurately.

Therefore, in the present embodiment, the IRI of the road surface is estimated by using the wheel speed ω in a case of estimating the IRI of the road surface. Specifically, by including the differential value of the wheel speed ω in the input of the trained model, the IRI of the road surface is estimated accurately. Note that, as shown in the above expression, since the change amount ow of the wheel speed is related to the change amount $\delta F_t$ of the vertical load, in the present embodiment, the IRI of the road surface is estimated by inputting the differential value of the wheel speed ω to the trained model.

Figure 6:
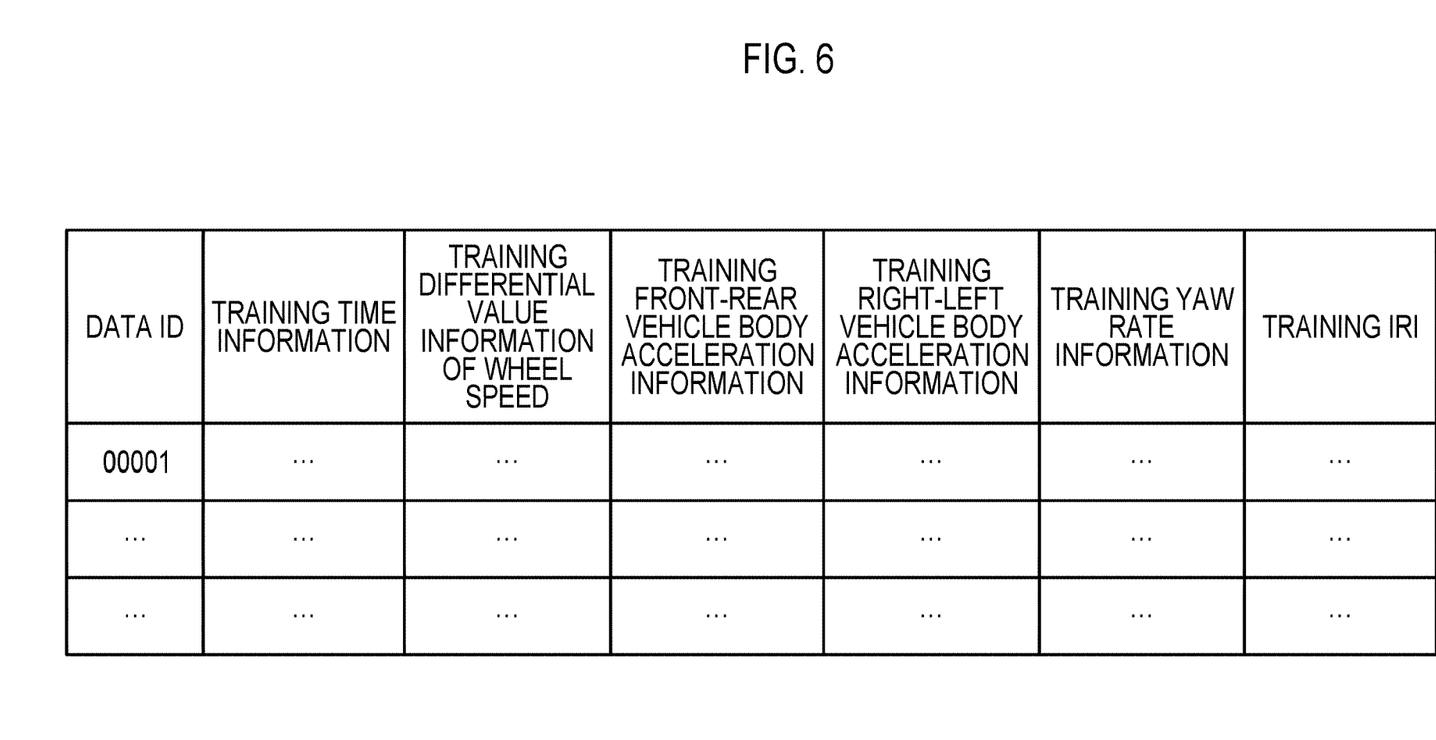
FIG. 6 is a diagram showing an example of training data used for generating a trained model.

Note that the trained model of FIG. 3 is generated by executing machine learning in advance based on training data collected in advance. Specifically, the trained model according to the present embodiment is generated by executing machine learning in advance based on the training data as shown in FIG. 6.

The acquisition unit 136 acquires the travel information of each of the vehicles 11-1, 11-2, 11-3 from the travel information storage unit 132.

The estimation unit 138 acquires the wheel speed information from the sensor information in the travel information of the vehicle 11 acquired by the acquisition unit 136 for each of the vehicles 11-1, 11-2, 11-3. Next, the estimation unit 138 calculates the differential value information of the wheel speed by differentiating the wheel speed information for each of the vehicles 11-1, 11-2, 11-3. The estimation unit 138 sets a combination of the differential value information of the wheel speed, the front-rear vehicle body acceleration information, the right-left vehicle body acceleration information, and the yaw rate information as the vehicle state information of the vehicle 11 for each of the vehicles 11-1, 11-2, 11-3.

Moreover, the estimation unit 138 estimates the IRI of the road surface on which each of the vehicles 11-1, 11-2, 11-3 has traveled by inputting the vehicle state information and the time information of each of the vehicles 11-1, 11-2, 11-3 to the trained model stored in the trained model storage unit 134.

The generation unit 140 adds the IRI of the road surface to a position in map data corresponding to the positional information in the travel information of the vehicle 11 to generate the map data to which the IRI of the road surface is added, based on the positional information in the travel information of the vehicle 11 acquired by the acquisition unit 136 and the IRI of the road surface estimated by the estimation unit 138, for each of the vehicles 11-1, 11-2, 11-3.

The display controller 142 performs a control to display the map data to which the IRI is added generated by the generation unit 140 on a display device (not shown). Note that the display controller 142 may store the map data to which the IRI of the road surface is added generated by the generation unit 140 in a predetermined storage unit (not shown).

Figure 7:
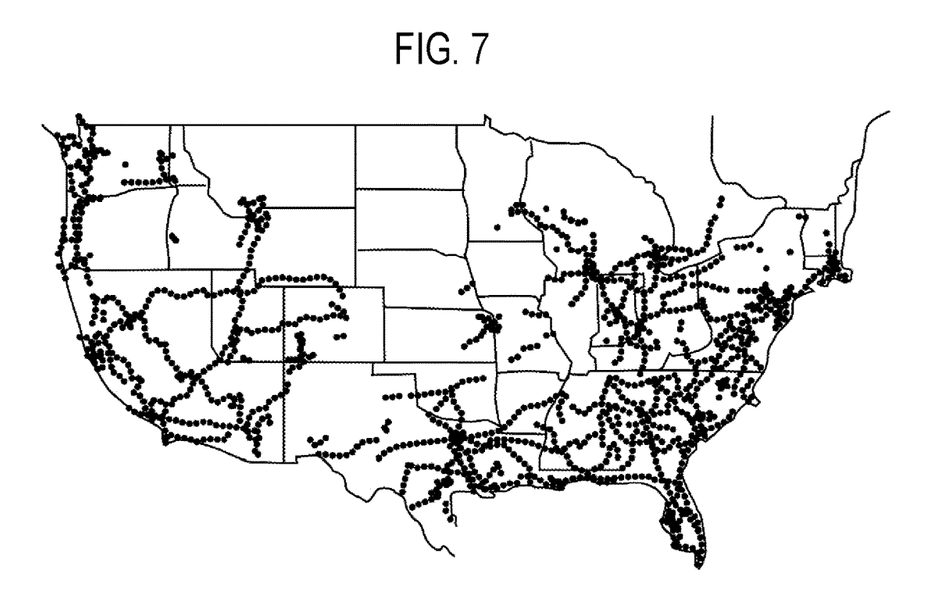
FIG. 7 is a diagram showing an example of map data to which an IRI of a road surface is added.

FIG. 7 shows an example of the map data to which the IRI of the road surface is added. The dots in FIG. 7 indicate roads to which the IRI is added. Regarding the map data of FIG. 7, for example, the shade of the dot may be displayed to be darker as a value of the IRI of the road surface is higher, and the shade of the dot may be displayed to be lighter as the value of the IRI of the road surface is lower. Alternatively, for example, the value of the IRI of the road surface may be expressed by a color. As a result, the surface roughness information of a plurality of roads is appropriately visualized.

Figure 8:
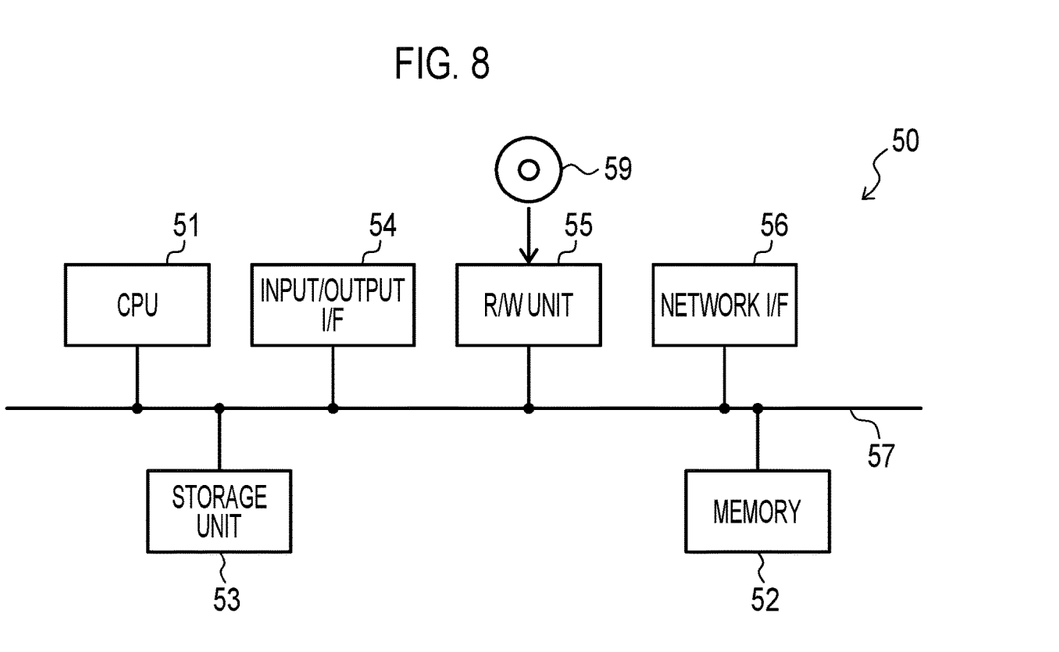
FIG. 8 is a diagram showing a configuration example of a computer constituting an information processing apparatus.

The information processing apparatus 13 can be realized by, for example, a computer 50 as shown in FIG. 8. The computer 50 includes a CPU 51, a memory 52 as a temporary storage region, and a non-volatile storage unit 53. In addition, the computer 50 includes an input/output interface (I/F) 54 to which an input/output device (not shown) or the like is connected, and a read/write (R/W) unit 55 that controls reading and writing of data to a recording medium 59. In addition, the computer 50 includes a network I/F 56 connected to a network, such as the Internet. The CPU 51, the memory 52, the storage unit 53, the input/output I/F 54, the R/W unit 55, and the network I/F 56 are connected to each other via a bus 57.

The storage unit 53 can be realized by a hard disk drive (HDD), a solid state drive (SSD), a flash memory, or the like. A program operating the computer 50 is stored in the storage unit 53 as a storage medium. The CPU 51 reads out the program from the storage unit 53, expands the read-out program into the memory 52, and sequentially executes the processes included in the program.

Next, the operations of the information processing apparatus 13 of the embodiment will be described.

The vehicle control devices 118 of the vehicles 11-1, 11-2, 11-3 sequentially transmit the positional information and the sensor information at each time to the information processing apparatus 13, so that a plurality of pieces of the travel information is stored in the travel information storage unit 132 of the information processing apparatus 13. Moreover, in a case where the information processing apparatus 13 receives an instruction signal for generating the map data to which the IRI is added, the information processing apparatus 13 executes an information processing routine shown in FIG. 9.

Figure 9:
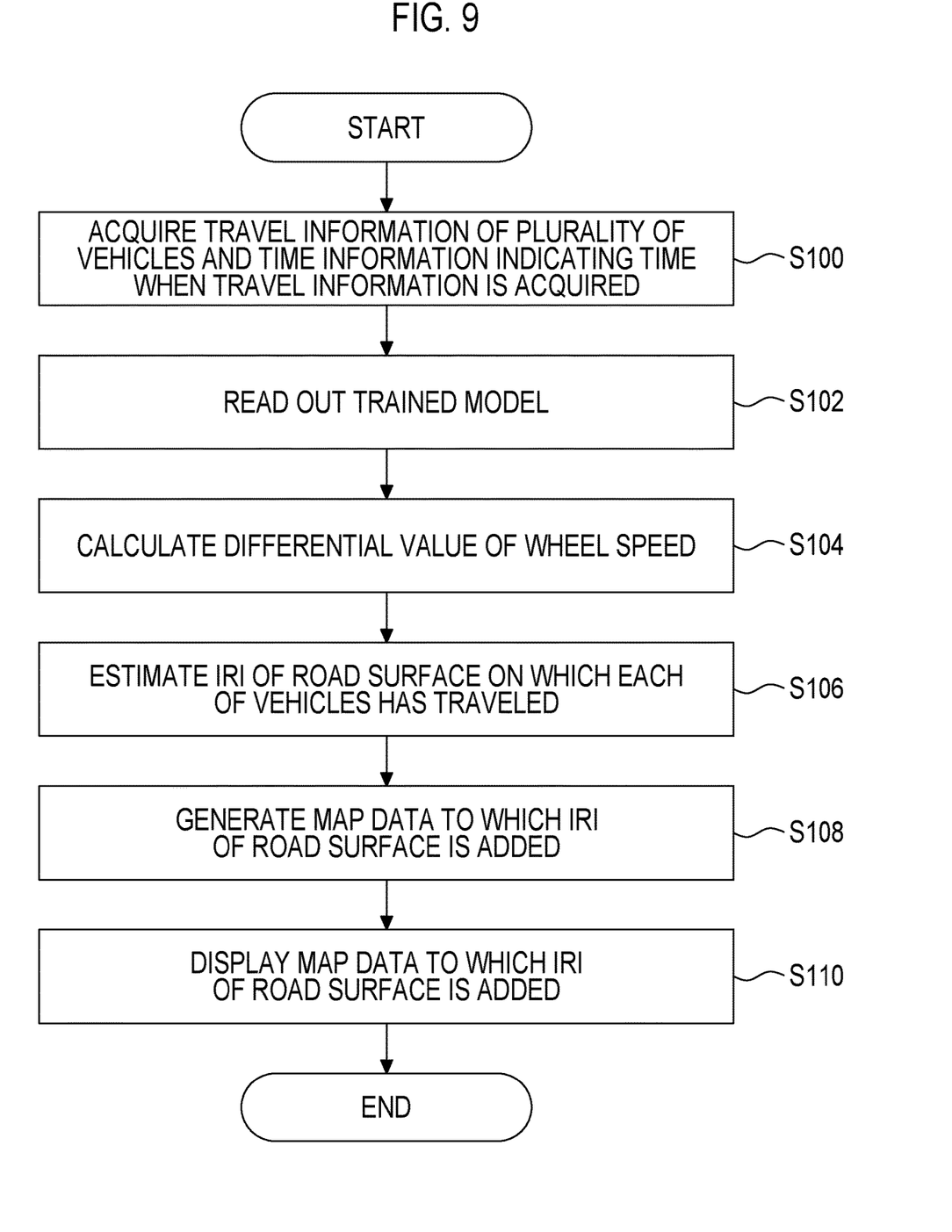
FIG. 9 is a diagram showing an example of information processing executed by the information processing apparatus according to the embodiment.

In step S100, the acquisition unit 136 acquires the travel information of each of the vehicles 11-1, 11-2, 11-3 and the time information indicating the time when the travel information is acquired from the travel information storage unit 132.

In step S102, the estimation unit 138 reads out the trained model stored in the trained model storage unit 134.

In step S104, the estimation unit 138 calculates the differential value of the wheel speed by differentiating the wheel speed information in the vehicle state information of each of the vehicles 11-1, 11-2, 11-3 acquired in step S100. Moreover, the estimation unit 138 sets the differential value information of the wheel speed, the front-rear vehicle body acceleration information, the right-left vehicle body acceleration information, and the yaw rate information as the vehicle state information for each of the vehicles 11-1, 11-2, 11-3.

In step S106, the estimation unit 138 estimates the IRI of the road surface on which each of the vehicles 11-1, 11-2, 11-3 has traveled by inputting the time information and the vehicle state information to the trained model stored in the trained model storage unit 134.

In step S108, the generation unit 140 adds the IRI of the road surface estimated in step S106 to the position in the map data corresponding to the positional information acquired in step S100 to generate the map data to which the IRI of the road surface is added.

In step S110, the display controller 142 displays the map data to which the IRI is added generated in step S108 on the display device (not shown), and terminates the information processing routine.

As described above, the information processing apparatus 13 according to the present embodiment acquires the vehicle state information for each of the vehicles. The information processing apparatus 13 estimates the road surface state information of the road surface on which each of the vehicles has traveled, based on the acquired vehicle state information for each of the vehicles. The information processing apparatus 13 estimates the road surface state information by inputting the vehicle state information to the trained model that outputs the road surface state information in a case where the vehicle state information is input and that has been trained in advance based on the training data in which the vehicle state information and the road surface state information are associated with each other. As a result, it is possible to easily estimate the road surface state from the vehicle state information of the vehicles by using the trained model generated in advance by machine learning.

The information processing apparatus 13 according to the present embodiment acquires the travel information indicating the combination of the vehicle state information for each of the vehicles indicating the travel state of the vehicle obtained in a case where the vehicle has traveled and the positional information of the vehicle that has traveled, from the travel information storage unit that stores the travel information. The information processing apparatus 13 estimates the road surface roughness information of the road surface on which the vehicle has traveled, based on the vehicle state information in the acquired travel information of the vehicle for each of the vehicles. Moreover, the information processing apparatus 13 adds the road surface roughness information to the position corresponding to the positional information in the map data to generate the map data to which the road surface roughness information is added, based on the positional information in the acquired travel information of the vehicle for each of the vehicles, and the estimated road surface roughness information. As a result, it is possible to visualize the information on the road surface roughness of the roads.

In addition, the information processing apparatus 13 according to the present embodiment can accurately estimate the IRI of the road surface by using the wheel speed information of the vehicle.

Note that the processing performed by each device in the embodiment described above has been described as software processing performed by executing the program, the processing may be processing performed by hardware. Alternatively, the processing may be a combination of both software and hardware. In addition, the program stored in a ROM may be stored in various storage media and distributed.

In addition, the processing performed by each device in the embodiment described above may be executed by one of various processors, or may be executed by a combination of two or more processors of the same type or different types.

Further, the present disclosure is not limited to the above, and it is needless to say that the present disclosure can be variously modified and implemented within a range not deviating from the gist of the present disclosure.

For example, in the embodiment described above, the case where the trained model is used in a case of estimating the IRI of the road surface has been described as an example, but the present disclosure is not limited to this. For example, a predetermined correlation function as disclosed in JP 2015-028456 A may be used.

In addition, in the embodiment described above, the case where the LSTM network is used has been described as an example, but the present disclosure is not limited to this. For example, other types of neural networks may be used as the trained model.

In a case where a neural network different from the LSTM network is used as the trained model, in some cases, the time slip information as input information is no longer needed.

In addition, in the embodiment described above, the case where the IRI of the road surface is estimated by using the differential value information of the wheel speed has been described as an example, but the present disclosure is not limited to this. For example, the IRI of the road surface may be estimated by using the wheel speed information itself. In this case, the wheel speed information, the front-rear vehicle body acceleration information, the right-left vehicle body acceleration information, and the yaw rate information are set as the vehicle state information, and the IRI of the road surface is output in a case where the vehicle state information is input to the trained model. In addition, instead of using the differential value information of the wheel speed or the wheel speed information, the front-rear vehicle body acceleration information, the right-left vehicle body acceleration information, and the yaw rate information as the vehicle state information, at least one of the pieces of information may be used as the vehicle state information to estimate the IRI of the road surface.

In addition, in the embodiment described above, the case where the IRI is estimated as the road surface roughness information has been described as an example, but the present disclosure is not limited to this. Other types of road surface roughness information may be estimated.

In addition, in the embodiment described above, the case where the road surface roughness information is estimated as the road surface state information has been described as an example, but the present disclosure is not limited to this, and other types of road surface state information may be estimated. For example, foreign matter information indicating a degree of the presence of a foreign matter on the road surface may be estimated as the road surface state information. In this case, for example, the yaw rate information of the vehicle is input to the trained model, and a probability indicating the degree of the presence of the foreign matter is output from the trained model as the foreign matter information. In a case where the foreign matter is present on the road surface, the vehicle is expected to travel to quickly avoid the foreign matter. In this case, the behavior of the vehicle avoiding the foreign matter appears in the yaw rate of the vehicle. Therefore, by generating a trained model based on training data in which training yaw rate information and training foreign matter information are associated with each other and using the trained model, it is possible to easily and accurately estimate the foreign matter information from the yaw rate information of the vehicle.

Alternatively, for example, slip information indicating a degree indicating that the vehicle that travels on the road surface is likely to slip or a degree indicating that a hydroplaning phenomenon is likely to occur may be estimated as the road surface state information. For example, when it is raining or snowing, the vehicle that travels on the road surface is likely to slip. In this case, for example, information indicating at least one of the wheel speed, the vehicle speed, a frictional coefficient, and lateral acceleration (for example, right-left vehicle body acceleration) is input to the trained model, and a probability indicating that the degree indicating that the vehicle is likely to slip or the degree indicating that a hydroplaning phenomenon is likely to occur is output from the trained model as the slip information by generating a trained model based on training data in which information indicating at least one of a training wheel speed, a training vehicle speed, a training frictional coefficient, and training lateral acceleration, and training slip information are associated with each other and using the trained model, it is possible to easily and accurately estimate the slip information from the information indicating at least one of the wheel speed, the vehicle speed, the frictional coefficient, and the lateral acceleration.

In addition, in the embodiment described above, the case where the map data to which the IRI as an example of the road surface roughness information is added is displayed on the display device (not shown) has been described as an example, but the present disclosure is not limited to this. For example, at least one of the information processing apparatus 13 and the vehicle control device 118 may further include a travel route generation unit that generates the travel route of the vehicle. The travel route generation unit has a function of a so-called navigation system. In this case, for example, in a case where the road surface state information of the road surface indicates an abnormal state, the travel route generation unit of at least one of the information processing apparatus 13 and the vehicle control device 118 may generate the travel route of the vehicle without including the road corresponding to the road surface in the travel route of the vehicle. For example, the travel route generation unit of at least one of the information processing apparatus 13 and the vehicle control device 118 executes processing of not guiding the road with a poor road surface state as the travel route based on the estimated road surface state information. For example, the travel route generation unit determines that the road surface state is poor or the road surface state is abnormal in a case where the road surface roughness information is equal to or higher than a threshold value, in a case where the foreign matter information is equal to or higher than a threshold value, or in a case where the slip information is equal to or higher than a threshold value, and generates the travel route of the vehicle without including the road corresponding to the road surface in the travel route of the vehicle. As a result, the travel route that avoids the road of which the road surface is in the abnormal state is appropriately presented.

The invention claimed is:

1. An information processing apparatus comprising a processor configured to:
acquire vehicle state information for each of a plurality of vehicles; and
acquire an output value of estimated road surface state information of a road surface on which each of the vehicles has traveled from a trained model that outputs the output value when the acquired vehicle state information is input to the trained model, the trained model having been trained in advance based on training data in which vehicle state information as training data and road surface state information as training data are associated with each other, wherein
the vehicle state information includes a wheel speed of a right front wheel of the vehicle, a wheel speed of a left front wheel of the vehicle, a wheel speed of a right rear wheel of the vehicle, and a wheel speed of a left rear wheel of the vehicle, and
the estimated road surface state information is an estimated international roughness index (IRI) that indicates road surface roughness, and
the processor is further configured to
calculate a differential value of the wheel speed of the right front wheel, a differential value of the wheel speed of the left front wheel, a differential value of the wheel speed of the right rear wheel, and a differential value of the wheel speed of the left rear wheel, input, to the trained model, the differential value of the wheel speed of the right front wheel, the differential value of the wheel speed of the left front wheel, the differential value of the wheel speed of the right rear wheel, and the differential value of the wheel speed of the left rear wheel, acquire an output value of the estimated IRI, and perform a control to display map data to which the output value of the estimated IRI is added.

2. The information processing apparatus according to claim 1, wherein the processor is further configured to, in a case where the estimated road surface state information indicates an abnormal state, generate a travel route of the vehicle excluding a road having the abnormal state in the travel route of the vehicle.

3. The information processing apparatus according to claim 1, wherein the vehicle state information further includes at least one of information indicating front-rear vehicle body acceleration of the vehicle, information indicating right-left vehicle body acceleration of the vehicle, and information indicating a yaw rate of the vehicle.

4. The information processing apparatus according to claim 1, wherein the processor is further configured to:

acquire travel information indicating a combination of the vehicle state information for each of the vehicles and positional information when the vehicle state information is acquired, from a storage unit included in the information processing apparatus and configured to store the travel information;

acquire the output value of the estimated road surface state information of the road surface on which the vehicle has traveled, based on the vehicle state information in the acquired travel information of the vehicle; and add the output value of the estimated road surface state information to a position corresponding to the positional information in map data to generate the map data to which the output value of the estimated road surface state information is added, based on the positional information in the acquired travel information of the vehicle, and the output value of the estimated road surface state information.

\* \* \* \* \*